J. W. HOAG.
SPEED GOVERNOR.
APPLICATION FILED JULY 21, 1914. RENEWED JAN. 29, 1917.
1,240,450.
Patented Sept. 18, 1917.
2 SHEETS—SHEET 2.
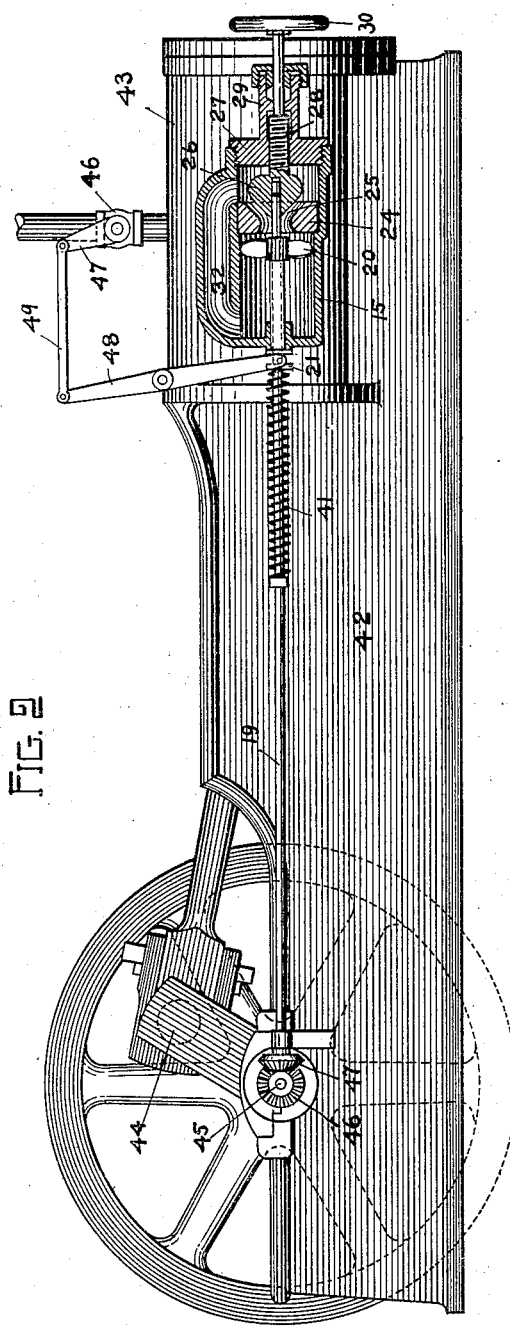
WITNESSES
F. V. Schiller.
M. Parker
INVENTOR
James W. Hoag
By Marcus S. Leve
his Atty.

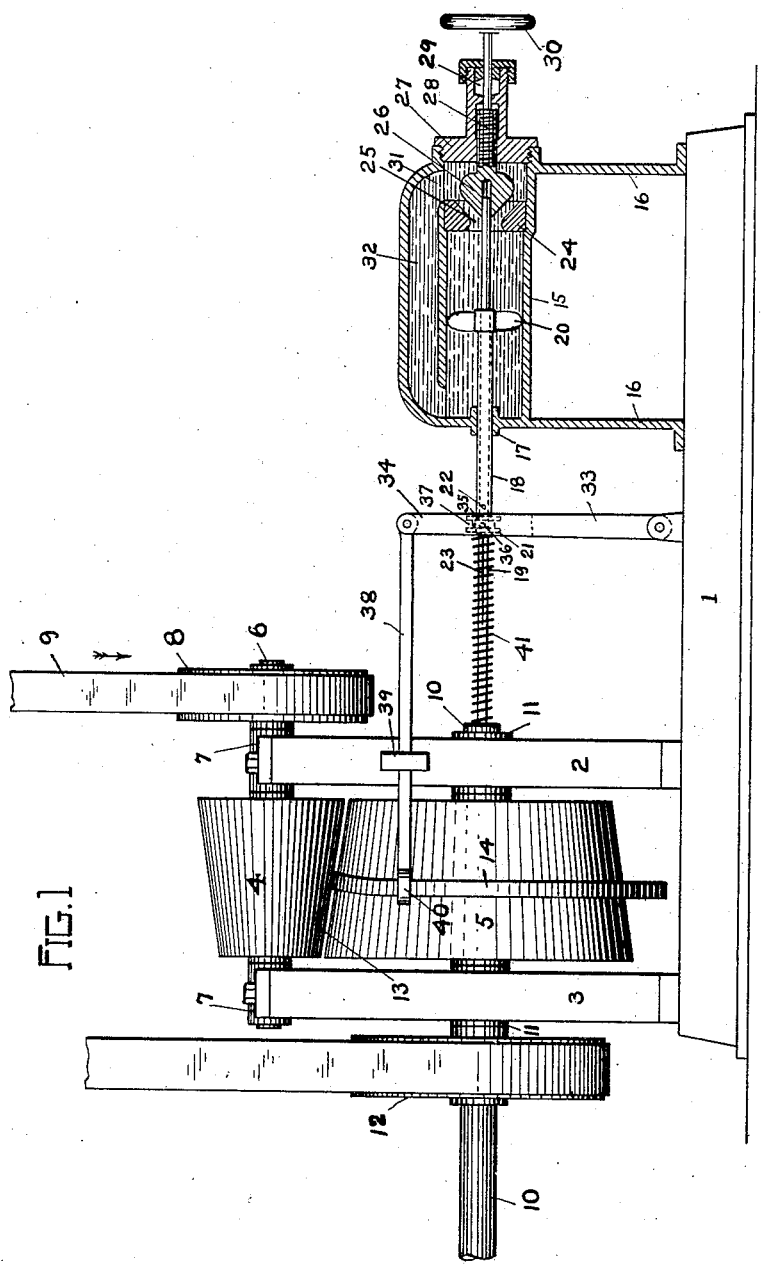

UNITED STATES PATENT OFFICE.

JAMES W. HOAG, OF OAKLAND, CALIFORNIA.

SPEED-GOVERNOR.

1,240,450. Specification of Letters Patent. Patented Sept. 18, 1917.

Application filed July 21, 1914, Serial No. 852,306. Renewed January 29, 1917. Serial No. 145,310.

*To all whom it may concern:*

Be it known that I, JAMES W. HOAG, a citizen of the United States, residing at Oakland, in the county of Alameda and State of California, have invented a new and useful Speed-Governor, of which the following is a specification.

My invention relates to improvements in speed governors, which are connected to a shaft, driven by a prime motor, or by another driving shaft, and it has for its object to maintain said driven shaft at a uniform rate of speed.

With this in view, I attach the governor shaft direct to said driven shaft, so as to run in unison with it, or I gear it to said shaft, so as to run at another proportionate rate of speed, higher or lower, than the speed of said driven shaft, as the requirements might be, and I furnish the governor shaft with an actuating member, adapted to engage and act upon a liquid, contained in a circulating vessel, causing said liquid to circulate with a greater or less velocity, depending upon the speed of said governor shaft, and upon the area of cross section of the channel of the vessel; and I provide a regulating valve whereby the cross section of said channel may be increased or diminished, thus diminishing or increasing the resistance offered to said actuating member and accordingly diminishing or increasing the hydrostatic pressure within the vessel between said actuating member and said regulating valve.

The variation in the intensity of such a pressure is utilized to regulate by means of the proper mechanism the ratio of gearing between the driving and driven shafts, required to maintain the latter at a very nearly constant speed, or to determine the supply of energy to the prime motor for the same purpose of preserving the constant speed of said driven shaft.

Referring now to the drawings hereunto annexed for a detailed description of my invention:

Figure 1 is a sectional side elevation of a governor, as applied to a device for a variable ratio of gearing of the friction cone type; and Fig. 2 is a sectional side elevation of a similar governor as applied to a steam engine.

1 is a base, provided with the standards 2 and 3, which serve to support the cone friction pulleys 4 and 5 of a device for a variable ratio of gearing. At the top of said standards a driving shaft 6 is mounted in the bearings 7, 7 and is provided with a tight pulley 8, driven by a belt 9 in the direction shown by the arrow. The driving cone friction pulley 4 is keyed to said shaft 6. The driven shaft 10 is mounted in the bearings 11, 11 and is provided with the cone friction pulley 5, keyed to it, and with the tight pulley 12. The cones 4 and 5 may be made of the same, or of different diameters, according to the ratio of gearing required between the driving and the driven shafts; they are made of the same taper, and are set between the standards 2 and 3, so as to face in opposite directions. The bearings 7, 7 and 11, 11 are so arranged on the standards, as to cause the shafts to run parallel; and the distance between them is such, as to bring the adjacent surfaces of the two cones close together, leaving a narrow space 13 between them. A short endless belt 14 is made to run loosely over one of the cones, fitting tightly in the narrow space 13, thus forming a friction contact between the surfaces of the cones.

The relative speed of the cones depends upon the particular location of the belt 14 along the narrow space 13; when brought nearer to the smaller end of the driven cone 5, the relative speed of said cone is increased; while, when carried farther away, it is diminished.

The base 1 also carries the circulating vessel filled with a liquid and fitted with an actuating member to cause the circulation of said liquid. The circulating vessel may have a variety of forms and the actuating member may operate in a variety of ways to cause the liquid in the vessel to circulate, without departing from the principle of my present invention. Here the vessel is shown to consist of a cylindrical body 15, mounted on the base 1 by the standards 16, so as to be in line with the driven shaft 10. At the end of the cylindrical body next to the friction clutch a bearing 17 is shown in the cylinder head, fitting the sleeve 18, while through the inner bore of the sleeve the governor shaft 19 is made to pass, being secured at one end to the driven shaft 10, and revolving together with it, and with the other end extending far into the cylinder 15. A screw propeller 20 is fitted in the inner bore of the cylinder, and is secured at one end of the sleeve 18, while a grooved collar 21 is secured at the other end. A pin 22, secured in the sleeve, engages a slotted key way 23, cut for some distance in the governor shaft 19, connecting the sleeve to said shaft, so as to revolve together, while permitting the sliding motion of the sleeve along said shaft.

A partition 24 is fitted near the other end of the cylindrical part 15 of the circulating vessel, and within said partition a valve opening 25 is bored to fit a conical regulating valve 26. Beyond the partition the cylindrical body extends for a short distance, where a thread is cut at the extreme end, to receive the cylinder head 27. The regulating valve 26 is provided with a stem, having a threaded part 28, fitted to work in the tapped hole in the cylinder head 27, and the reduced end of the stem is made to pass through a stuffing box 29 outside the vessel, where it receives the hand wheel 30. By turning the hand wheel 30 the area of cross section of the stream of liquid, passing through the valve opening, may be made larger or smaller; an increase in area will diminish the velocity of the stream and the hydrostatic pressure behind the partition 24; while a decrease in area will increase the speed of the stream and the hydrostatic pressure behind said partition.

The space 31 in the circulating vessel between the partition 24 and the cylinder head 27 is connected by a by-pass 32 with the opposite end of the cylinder.

A lever 33 is pivoted at one end to the base 1 and is provided at the other end with the forked prongs 34 and 35, straddling the grooved collar 21. A pin 36, held fast in one of said prongs, is made to engage the groove 37 in said collar, thus coupling them together. A belt shifting bar 38 is pivoted at one end to the prong 34, while the other end, after passing through a guiding block 39 on the standard 2, engages the endless belt 14 by means of the loop 40. A spiral compression spring 41 is placed around the governor shaft between the collar 21 and the end of the driven shaft 10, for the purpose of counteracting the hydrostatic pressure on the screw propeller, as hereinafter set forth.

The governor is first adjusted for the speed required by turning the hand wheel 30, so as to close the valve opening 25 more or less.

The shaft 6 is driven by the belt 9 from a shaft above (not shown) with a very irregular speed, and the object of the governor is to transmit that irregular speed to the driven shaft 10, transforming it at the same time into a uniform speed.

From the arrangements of the cones 4 and 5, the belt 14, and the shifting mechanism it is seen, that the ratio of speeds between the two cones depends upon the particular position of the belt 14 along the narrow space 13, and upon the position of the belt shifting mechanism; and that for any particular ratio of speeds between the aforesaid cones there is a corresponding force of the compression spring.

Let us suppose that the shaft 6 is running for a short time with a uniform speed, equal to its average, and that, to obtain the speed required for the shaft 10, the belt 14 has to be at the middle of the narrow slot 13. The driven shaft 10, the governor shaft 19 and the screw propeller 20 will revolve for that short length of time at the required uniform speed. The blades of the revolving screw propeller will act upon a definite volume of liquid, forcing it through the contracted valve opening 25 with a velocity proportionate to said volume, and creating a hydrostatic pressure in front of the screw propeller sufficient to impart the said velocity. This hydrostatic pressure will react upon the screw propeller, forcing it away from the partition and by moving it to the left, will compress the spring 41.

When the speed of the screw propeller remains constant, the hydrostatic pressure will vary with the square of the spouting velocity of the liquid through the valve opening, and this velocity depends upon the area of cross section of the stream.

In adjusting the governor to the required speed the hand wheel 30 is turned so as to close the valve opening to such an extent as to bring up the hydrostatic pressure acting upon the screw propeller high enough to counterbalance the force of compression of the spring 41, when the belt 14 is held at the middle of the narrow slot 13 by the shifting mechanism.

So long as the driving shaft will run with a uniform speed, the belt 14 and the shifting mechanism will remain in the same position, the pressure on the screw propeller, and the force of the spring will remain balanced.

When the shaft 6 begins to run at a higher rate of speed than its mean, the belt 14, remaining at the middle of the narrow space 13 as before, the driven shaft 10, together with the governor shaft 19 and the screw propeller 20 will also begin to move at a proportionately higher rate of speed. The hydrostatic pressure acting upon the screw propeller will instantly increase, overbalancing the opposing force of the spring 41, and will move the screw propeller and all the belt shifting mechanism to the left up to such a point, where the force of the spring 41 will increase sufficiently to again balance the hydrostatic pressure acting upon the propeller. The advance of the shifting mechanism to the left will cause the belt 14 to change the point of friction contact between the cones 4 and 5, changing the ratio of speeds, so as to lower the speed of the driven cone, bringing it very near back to the normal speed.

When the driving shaft 6 will run slower than the mean speed, the action will be reversed. The diminished speed of the driven shaft 10, and of the governor shaft 19 will cause the screw propeller 20 to move slower and the hydrostatic pressure acting upon the propeller will fall. The spring 41 will expand to a point, where its tension will become diminished to the same extent, and while so expanding will cause the belt shifting mechanism to move to the right, thus changing the ratio of gearing between the cones 4 and 5, so as to increase the speed of the latter, bringing it back to the normal speed.

The governor can be very readily adjusted, so as to maintain the driven shaft at a uniform speed, higher or lower, than the one above stated; the adjustment being made without stopping the machine. For the adjustment of the governor to increase the speed of the driven shaft, the hand wheel 30 is turned, so as to open the regulating valve 26, thus lowering the spouting velocity through the valve opening, and the hydrostatic pressure causing that velocity. The pressure upon the screw propeller will become insufficient to counteract the tension of the spring 41, and the latter will extend, forcing the belt shifting mechanism to the right, thus changing the ratio of the gearing between the driving shaft 6 and the driven shaft 10, increasing the speed of the latter. For diminishing the speed of the driven shaft 10 the valve opening 25 is diminished, increasing the spouting velocity of the discharge through said opening, and increasing the hydrostatic action upon the propeller, forcing the latter to move to the left, and by shifting the belt 14, diminish the speed of the driven shaft 10.

From the description above it is evident that the governor is capable of sustaining a driven shaft at a uniform rate of speed, while allowing the driving shaft to maintain all the irregularities of motion, by automatically changing the ratio of gearing between the driving and driven shafts.

The governor may also be employed to sustain a shaft of a primary motor at a uniform rate of speed by acting upon the source of supply of energy to said motor. Fig. 2 illustrates the application of my invention to govern an ordinary steam engine. 42 is the frame of the engine, 43 that of the engine cylinder, 44 the crank, 45 the crank shaft. A pair of bevel wheels 46 and 47 connect the engine shaft with the governor shaft 19. The circulating vessel 15 of the governor is placed near the throttle valve 46, located in the steam delivery pipe of the engine. The action of the circulating liquid of the governor remains the same; an increase in speed of the engine shaft will cause the screw propeller to move farther to the left, compressing the spring 41; and the grooved collar 21, acting upon the lever 47 of the throttle valve through the medium of the lever 48, and the link 49, will move said lever 47 to the right, partly closing the throttle valve and diminishing the amount of steam admitted to the cylinder, will thus reduce the speed of the engine shaft. A fall in speed will cause the governor to act in the opposite direction, and cause the supply of steam to be increased, so as to bring the engine shaft to the normal speed.

Having thus described my invention, what I claim and desire to secure by Letters Patent is:

1. A speed governor comprising a vessel provided with a circulating channel, a liquid carried by said vessel, a driven member, a source causing the motion of said driven member, a governor shaft, an actuating member operated by said governor shaft, adapted to act upon said liquid, so as to create a hydrostatic pressure within said vessel, mechanism adapted to be acted upon by said pressure and forced to move in one direction for a greater or less distance varying with the said pressure, means adapted to act yieldingly upon said mechanism so as to counterbalance the force of said variable pressure at each position of said mechanism and means connecting said mechanism with said source.

2. A speed governor comprising a vessel provided with a circulating channel, a liquid carried by said vessel, a driven member, a source causing the motion of said member, a governor shaft, an actuating member operated by said governor shaft adapted to act upon said liquid, so as to create a hydrostatic pressure within said vessel, mechanism adapted to be acted upon by said pressure and forced to move in one direction for a greater or less distance varying with the said pressure, a spring adapted to counterbalance the force of said varying pressure at each position of said mechanism, and means connecting said mechanism with said source.

3. A speed governor comprising a vessel provided with a circulating channel, a liquid carried by said vessel, a driven member, a source causing the motion of said driven member, a governor shaft, a screw propeller slidably mounted on said governor shaft rotating in unison with it adapted to act upon said liquid, so as to create a hydrostatic pressure within said vessel and to be reacted upon by said pressure and forced to move in one direction, means acting yieldingly upon said propeller adapted to counterbalance the force of said pressure, and means connecting said propeller with said source.

4. A speed governor comprising a vessel provided with a circulating channel, a liquid carried by said vessel, a driven member, a source causing the motion of said member, a governor shaft, a screw propeller slidably mounted on said governor shaft, rotating in unison with it adapted to act upon said liquid so as to create a hydrostatic pressure within said vessel and to be reacted upon by said pressure and forced to move in one direction, a spring adapted to counterbalance the force of said pressure, and means connecting said propeller with said source.

5. A speed governor comprising a vessel provided with a circulating channel, a liquid carried by said vessel, a driven member, a source causing the motion of said driven member, a governor shaft, an actuating member operated by said governor shaft, adapted to act upon said liquid, so as to create a hydrostatic pressure within said vessel, varying with the speed of said actuating member, mechanism adapted to be acted upon by said varying hydrostatic pressure and forced to move in one direction, and means acting yieldingly upon said mechanism and adapted to counterbalance the force of said variable pressure, a shifting member adapted to be acted upon by the said counterbalancing opposing forces and to vary in position at each variation of the intensity of said forces, and means connecting said shifting member with said source so as to determine the action of the latter by the position of the former.

6. A speed governor comprising a vessel provided with a circulating channel, a liquid carried by said vessel, a driven member, a source causing the motion of said member, a governor shaft, an actuating member operated by said governor shaft adapted to act upon said liquid so as to create a hydrostatic pressure within said vessel, mechanism adapted to be acted upon by said pressure and forced to move in one direction for a greater or less distance, varying with the said pressure, means acting yieldingly upon said mechanism and adapted to counterbalance the force of said variable pressure at each position of said mechanism, means connecting said mechanism with said source adapted to determine the action of the latter by the intensity of the hydrostatic pressure upon the former, and means for changing the area of cross section of the channel for the purpose of increasing or decreasing the said hydrostatic pressure.

7. In a speed governor the combination of a circulating vessel comprising a main body, a partition, a valve opening within said partition and a by-pass connecting the space beyond the partition with the forward end of said main body, a liquid carried by said circulating vessel, a governor shaft, actuating mechanism operated by said governor shaft, adapted to act upon said liquid, forcing it to pass through said opening and creating a hydrostatic pressure behind said opening, mechanism adapted to be acted upon by said pressure and forced to move in one direction for a greater or less distance, varying with the said pressure, means acting yieldingly adapted to counterbalance the force of said variable pressure at each position of said mechanism, means connecting said mechanism with said source adapted to determine the action of the latter by the position of the former, and a regulating valve adapted to increase or decrease the said valve opening in order to change the adjustment of the governor to the desired rate of speed.

8. A speed governor comprising a driving shaft, a cone pulley carried by said shaft, a driven shaft, a cone pulley carried by said driven shaft, the two said pulleys being so placed as to face in opposite directions, and to leave a narrow space between their adjoining surfaces, an endless belt working in said narrow space forming a friction contact between said cones, a circulating vessel, a liquid carried by said vessel, an actuating member operated by said driven shaft, adapted to act upon said liquid, so as to create a hydrostatic pressure within said vessel, mechanism adapted to be acted upon by said hydrostatic pressure and forced to move in one direction, means acting yieldingly upon said mechanism, adapted to counterbalance the force of said pressure, and means connecting said mechanism with said endless belt for the purpose of shifting the latter along the said narrow space.

JAMES W. HOAG.

Witnesses:
F. V. SCHILLER,
NETTIE HAMILTON.

Copies of this patent may be obtained for five cents each, by addressing the "Commissioner of Patents, Washington, D. C."